(12) United States Patent
Lunttila et al.

(10) Patent No.: US 11,665,698 B2
(45) Date of Patent: May 30, 2023

(54) GRANTING RESOURCES FOR UPLINK TRANSMISSIONS

(71) Applicant: Nokia Technologies Oy, Espoo (FI)

(72) Inventors: Timo Lunttila, Espoo (FI); Klaus Hugl, Vienna (AT); Karol Schober, Helsinki (FI); Juha Korhonen, Espoo (FI); Ankit Bhamri, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 143 days.

(21) Appl. No.: 16/334,052

(22) PCT Filed: Sep. 25, 2017

(86) PCT No.: PCT/IB2017/055808
§ 371 (c)(1),
(2) Date: Mar. 18, 2019

(87) PCT Pub. No.: WO2018/060831
PCT Pub. Date: Apr. 5, 2018

(65) Prior Publication Data
US 2019/0274159 A1   Sep. 5, 2019

(30) Foreign Application Priority Data
Sep. 30, 2016  (EP) .................................... 16191881

(51) Int. Cl.
*H04W 72/12*   (2009.01)
*H04L 5/00*   (2006.01)
(Continued)

(52) U.S. Cl.
CPC ....... *H04W 72/1289* (2013.01); *H04L 5/0044* (2013.01); *H04L 5/0051* (2013.01);
(Continued)

(58) Field of Classification Search
CPC ......... H04W 72/1289; H04W 72/1268; H04W 72/14; H04W 72/1257; H04L 5/0053;
(Continued)

(56) References Cited

U.S. PATENT DOCUMENTS

| 2017/0149542 A1* | 5/2017 | Lee ........................ H04L 5/0044 |
| 2018/0048441 A1* | 2/2018 | Bagheri ................. H04L 5/0048 |

(Continued)

FOREIGN PATENT DOCUMENTS

| CN | 109156009 A | 1/2019 |
| WO | 2015/042594 A2 | 3/2015 |

(Continued)

OTHER PUBLICATIONS

62335763,Specification,May 13, 2016 (Year: 2016).*
(Continued)

*Primary Examiner* — Yu-Wen Chang
(74) *Attorney, Agent, or Firm* — Squire Patton Boggs (US) LLP

(57) ABSTRACT

A technique may include controlling downlink transmission of an uplink grant for one or more uplink data transmissions by a communication device. The uplink grant identifies one combination from a set of predetermined combinations of one or more transmission time intervals and one or more uplink reference signal transmissions, including at least one combination of two or more transmission time intervals and one or more uplink reference signal transmissions. The technique may also include using the one or more uplink reference signal transmissions of the identified combination to assist the recovery of data from the one or more uplink radio data transmissions by the communication device in the one or more transmission time intervals of the identified combination.

20 Claims, 4 Drawing Sheets

(51) Int. Cl.
*H04W 72/1268* (2023.01)
*H04W 72/14* (2009.01)

(52) U.S. Cl.
CPC .......... *H04L 5/0053* (2013.01); *H04L 5/0092* (2013.01); *H04W 72/1268* (2013.01); *H04W 72/14* (2013.01); *H04L 5/003* (2013.01)

(58) Field of Classification Search
CPC ... H04L 5/0044; H04L 5/0051; H04L 5/0092; H04L 5/003
See application file for complete search history.

(56) References Cited

U.S. PATENT DOCUMENTS

| | | | |
|---|---|---|---|
| 2018/0049175 A1* | 2/2018 | Bagheri | H04L 41/08 |
| 2018/0077719 A1* | 3/2018 | Nory | H04L 5/0042 |
| 2018/0242347 A1* | 8/2018 | Sahlin | H04W 72/0446 |
| 2019/0007248 A1* | 1/2019 | Takeda | H04W 72/12 |
| 2019/0028162 A1* | 1/2019 | Lee | H04B 7/0486 |
| 2019/0069312 A1* | 2/2019 | Oh | H04W 52/34 |
| 2019/0090276 A1* | 3/2019 | Lee | H04W 72/1284 |
| 2019/0174354 A1* | 6/2019 | Li | H04W 28/085 |
| 2019/0190763 A1* | 6/2019 | Takeda | H04L 27/2662 |
| 2019/0199502 A1* | 6/2019 | Wang | H04W 72/0446 |
| 2019/0222379 A1* | 7/2019 | Kim | H04L 5/0026 |
| 2019/0296872 A1* | 9/2019 | Fehrenbach | H04W 72/1205 |
| 2019/0312669 A1* | 10/2019 | Kwak | H04L 5/0055 |
| 2021/0021454 A1* | 1/2021 | Horiuchi | H04W 52/346 |

FOREIGN PATENT DOCUMENTS

| | | |
|---|---|---|
| WO | 2016/190591 A1 | 12/2016 |
| WO | 2017/078595 A1 | 5/2017 |
| WO | 2017/135880 A1 | 8/2017 |
| WO | 2017/196250 A1 | 11/2017 |

OTHER PUBLICATIONS

62314396,Specification (Year: 2016).*
Office action received for corresponding Korea Patent Application No. 2019-7012428, dated May 21, 2020, 5 pages of office action and 4 pages of Translation available.
Office action received for corresponding European Patent Application No. 16191881.8, dated Jun. 5, 2019, 7 pages.
Office action received for corresponding Chilean Patent Application No. 201900838, dated Jun. 15, 2020, 14 pages of office action and no pages of Translation available.
"New SI proposal: Study on Latency Reduction Techniques for LTE", 3GPP TSG-RAN meeting #67, RP-150465, Agenda: 13.1.2, Ericsson, Mar. 9-12, 2015, 7 pages.
"New Work item on Shortened TTI and Processing Time for LTE", 3GPP TSG-RAN meeting #72, RP-161299, Agenda: 10.1.1, Ericsson, Jun. 13-16, 2016, 8 pages.

"3rd Generation Partnership Project; Technical Specification Group Radio Access Network: Evolved Universal Terrestrial Radio Access (E-UTRA); Study on latency reduction techniques for LTE (Release 14)", 3GPP TR 36.881, V14.0.0, Jun. 2016, 249 pages.
"On Requirements of DM-RS Design for UL shorter TTI", 3GPP TSG-RAN Working Group 1 meeting #86, R1-167018, Agenda: 7.2.12.2.1, Nokia, Aug. 22-26, 2016, 4 pages.
Extended European Search Report received for corresponding European Patent Application No. 16191881.8, dated Mar. 2, 2017, 10 pages.
"Design Aspects of sPUSCH", 3GPP TSG-RAN Working Group 1 meeting #86, R1-167491, Agenda: 7.2.12.2.1, Ericsson, Aug. 22-26, 2016, pp. 1-5.
"UL Channel Design for Shortened TTI", 3GPP TSG-RAN Working Group 1 meeting #86, R1-166310, Agenda: 7.2.12.2.1, Qualcomm Incorporated, Aug. 22-26, 2016, pp. 1-6.
"Discussion on UL RS for short TTI", 3GPP TSG-RAN Working Group 1 meeting #86, R1-166156, Agenda: 7.2.12.2.1, Huawei, Aug. 22-26, 2016, 4 pages.
International Search Report and Written Opinion received for corresponding Patent Cooperation Treaty Application No. PCT/IB2017/055808, dated Jan. 3, 2018, 21 pages.
"sPUSCH Design for LTE short TTI", 3GPP TSG-RAN Working Group 1 meeting #86, R1-166457, Agenda: 7.2.12.2.1, CATT, Aug. 22-26, 2016, 8 pages.
"Discussion on sPUSCH design for sTTI", 3GPP TSG-RAN Working Group 1 meeting #86, R1-166997, Agenda: 7.2.12.2.1, Spreadtrum Communications, Aug. 22-26, 2016, 4 pages.
"On UL DMRS Position for 2os TTI", 3GPP TSG-RAN Working Group 1 meeting #88bis, R1-1706071, Agenda: 7.2.1.2.1.2, Ericsson, Apr. 3-7, 2017, pp. 1-6.
"3rd Generation Partnership Project; Technical Specification Group Radio Access Network: Evolved Universal Terrestrial Radio Access (E-UTRA): Physical channels and modulation (Release 15)", 3GPP TS 36.211, V15.2.0, Jun. 2018, pp. 1-236.
Office action received for corresponding European Patent Application No. 16191881.8, dated Feb. 25, 2020, 8 pages.
"Discussions on sPDCCH for Latency Reduction", 3GPP TSG-RAN WG1 meeting #86, R1-166858, Agenda: 7.2.12.2.1, LG Electronics, Aug. 22-26, 2016, 8 pages.
"Discussion on sPDCCH Design for sTTI", 3GPP TSG-RAN WG1 meeting #86, R1-166996, Agenda: 7.2.12.2.1 , Spreadtrum Communications, Aug. 22-26, 2016, 3 pages.
Office action received for corresponding Chile Patent Application No. 201900838, dated Sep. 14, 2020, 10 pages of office action and no page of Translation available.
Indian Office Action issued in corresponding Indian Patent Application No. 201947010488 dated Nov. 28, 2020.
Korean Office Action issued in corresponding Korean Patent Application No. 10-2019-7012428 dated Nov. 26, 2020.
European Office Action issued in corresponding European Patent Application No. 16 191 881.8-1205 dated May 4, 2021.
Chinese Office Action issued in corresponding Chinese Patent Application No. 201780060833.9 dated Oct. 11, 2021.

* cited by examiner

| Joint indication or R5 and starting point | Symbol index | | | | | | | | | | | | | | | # of sTTIs scheduled |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | | |
| 000 | | | | | | | | | | | | | | | | |
| 001 | | | | | | | | | | | | | | | | |
| 010 | | | | | | | | | | | | | | | | |
| 011 | | | | | | | | | | | | | | | | |
| 100 | | | | | | | | | | | | | | | | 3 |
| 101 | | | | | | | | | | | | | | | | 4 |
| 110 | | | | | | | | | | | | | | | | 5 |
| 111 | | | | | | | | | | | | | | | | 6 |

FIG. 4b

GRANTING RESOURCES FOR UPLINK TRANSMISSIONS

RELATED APPLICATION

This application was originally filed as PCT Application No. PCT/IB2017/055808 on Sep. 25, 2017, which claims priority from EP application 16191881.8, filed Sep. 30, 2016.

The transfer of data over a wireless interface in a mobile communication system typically involves the transfer of data from a medium access control (MAC) layer to the physical (PHY) layer at the transmitting entity, and vice versa at a receiving entity. The transmission time interval (TTI) indicates how often data can be transferred between the MAC and PHY layers. In conventional wireless communication systems, the TTI is typically always one sub-frame, but there is a proposal to use transmission time intervals shorter than a sub-frame with the aim of reducing latency. In the example of frequency-division multiple access systems using sub-frames comprising 14 OFDM or SC-FDMA symbol time units, one proposal is to use transmission time intervals as short as two or three OFDM symbol time units.

The inventors for the present application have identified the challenges of (i) improving the efficiency of use of radio resources, and/or (ii) facilitating flexible use of uplink time resources, in a communication system involving the use of short transmission time intervals.

There is hereby provided a method comprising: controlling downlink transmission of an uplink grant for one or more uplink data transmissions by a communication device, wherein said uplink grant identifies one combination from a set of predetermined combinations of one or more transmission time intervals and one or more uplink reference signal transmissions, including at least one combination of two or more transmission time intervals and one or more uplink reference signal transmissions; and using said one or more uplink reference signal transmissions of the identified combination to assist the recovery of data from the one or more uplink radio data transmissions by said communication device in the one or more transmission time intervals of the identified combination.

According to one embodiment, the method further comprises: in advance of controlling downlink transmission of said uplink grant, controlling downlink transmission of control information for the communication device indicating use of said set of predetermined combinations for uplink transmissions from the communication device.

According to one embodiment, the method further comprises: controlling downlink transmission of said control information in a transmission time interval longer than a transmission time interval used for said transmission of said uplink grant.

According to one embodiment, the identified combination comprises a combination of two or more uplink transmission time intervals for two or more uplink data transmissions by the communication device, one or more uplink reference signal transmissions.

According to one embodiment, the indicated combination comprises a combination of one uplink transmission time interval for one uplink data transmissions by the communication device, and one or more uplink reference signal transmissions.

According to one embodiment, said set of predetermined combinations include one or more of the following: (a) one or more combinations in which an uplink reference signal occupies the first symbol after a first scheduled transmission time interval, and any additional transmission time intervals follow said uplink reference signal; (b) one or more combinations in which a single uplink reference signal occupies the first scheduled symbol, and one or more transmission time intervals occupy a contiguous set of symbols immediately after the uplink reference signal transmission; and (c) one or more combinations in which uplink reference signal transmissions occupy both the first scheduled symbol and a predetermined symbol.

According to one embodiment, the number of uplink reference signal transmissions is smaller than or equal to the number of transmission time intervals.

According to one embodiment, said set of predetermined combinations comprises at least one of: (i) a subset of combinations in which one or more transmission time intervals and one or more reference signal transmissions occupy a contiguous series of symbols ending with the last symbol of a sub-frame; and (ii) a subset of combinations in which one or more transmission time intervals and one or more reference signal transmissions occupy a contiguous series of symbols ending with the last symbol of the first half of a sub-frame.

According to one embodiment, said uplink grant indicates at least one of: (i) the number of said one or more uplink transmission time intervals for use by the communication device, (ii) the first symbol of a contiguous set of symbols occupied by the one or more uplink transmission time intervals and the one or more uplink reference signal transmissions, and (iii) the location of the one or more uplink reference signal transmissions within said contiguous set of symbols.

According to one embodiment, said one or more reference signals are uplink demodulation reference signals.

There is also provided a method, comprising: recovering an uplink grant from a downlink transmission made by a network node, wherein said uplink grant identifies one combination from a set of predetermined combinations of one or more transmission time intervals and one or more uplink reference signal transmissions, including at least one combination of two or more transmission time intervals and one or more uplink reference signal transmissions; and controlling the making of data transmissions in said one or more transmission time intervals of the identified combination.

According to one embodiment, the method further comprises: in advance of recovering said uplink grant: recovering, from one or more downlink transmissions by the network node, control information for the communication device indicating use of said set of predetermined combinations for uplink transmissions from the communication device.

According to one embodiment, said control information is transmitted in a transmission time interval longer than a transmission time interval used for transmission of said uplink grant.

According to one embodiment, the identified combination comprises two or more transmission time intervals for two or more uplink data transmissions by a communication device, and one or more uplink reference signal transmissions.

According to one embodiment, the identified combination comprises one transmission time interval for one uplink data transmission by a communication device, and one or more uplink reference signal transmissions.

According to one embodiment, said set of predetermined combinations include one or more of the following: (a) one or more combinations in which an uplink reference signal occupies the first symbol after a first scheduled transmission time interval, and any additional transmission time intervals follow said uplink reference signal; (b) one or more combinations in which a single uplink reference signal occupies the first scheduled symbol, and one or more transmission time intervals occupy a contiguous set of symbols immediately after the uplink reference signal transmission; and (c) one or more combinations in which uplink reference signal transmissions occupy both the first scheduled symbol and a predetermined symbol.

According to one embodiment, the number of uplink reference signal transmissions is smaller than, or equal to, the number of transmission time intervals.

According to one embodiment, said set of predetermined combinations comprises at least one of: (i) a subset of combinations in which one or more transmission time intervals and one or more reference signal transmissions occupy a contiguous series of symbols ending with the last symbol of a sub-frame; and (ii) a subset of combinations in which one or more transmission time intervals and one or more reference signal transmissions occupy a contiguous series of symbols ending with the last symbol of the first half of a sub-frame.

According to one embodiment, said uplink grant indicates at least one of: (i) the number of said uplink transmission time intervals for use by the communication device, (ii) the first symbol of a contiguous set of symbols occupied by the one or more uplink transmission time intervals and the one or more uplink reference signal transmissions, and (iii) the location of the one or more uplink reference signal transmissions within said contiguous set of symbols.

According to one embodiment, said one or more reference signals are uplink demodulation reference signals.

There is also hereby provided an apparatus comprising: a processor and memory including computer program code, wherein the memory and computer program code are configured to, with the processor, cause the apparatus to: control downlink transmission of an uplink grant for one or more uplink data transmissions by a communication device, wherein said uplink grant identifies one combination from a set of predetermined combinations of one or more transmission time intervals and one or more uplink reference signal transmissions, including at least one combination of two or more transmission time intervals and one or more uplink reference signal transmissions; and use said one or more uplink reference signal transmissions of the identified combination to assist the recovery of data from the one or more uplink radio data transmissions by said communication device in the one or more transmission time intervals of the identified combination.

According to one embodiment, the memory and computer program code are further configured to, with the processor, cause the apparatus to: in advance of controlling downlink transmission of said uplink grant, control downlink transmission of control information for the communication device indicating use of said set of predetermined combinations for uplink transmissions from the communication device.

According to one embodiment, the memory and computer program code are further configured to, with the processor, cause the apparatus to: control downlink transmission of said control information in a transmission time interval longer than a transmission time interval used for said transmission of said uplink grant.

According to one embodiment, the identified combination comprises a combination of two or more uplink transmission time intervals for two or more uplink data transmissions by the communication device, one or more uplink reference signal transmissions.

According to one embodiment, the indicated combination comprises a combination of one uplink transmission time interval for one uplink data transmissions by the communication device, and one or more uplink reference signal transmissions.

According to one embodiment, said set of predetermined combinations include one or more of the following: (a) one or more combinations in which an uplink reference signal occupies the first symbol after a first scheduled transmission time interval, and any additional transmission time intervals follow said uplink reference signal; (b) one or more combinations in which a single uplink reference signal occupies the first scheduled symbol, and one or more transmission time intervals occupy a contiguous set of symbols immediately after the uplink reference signal transmission; and (c) one or more combinations in which uplink reference signal transmissions occupy both the first scheduled symbol and a predetermined symbol.

According to one embodiment, the number of uplink reference signal transmissions is smaller than or equal to the number of transmission time intervals.

According to one embodiment, said set of predetermined combinations comprises at least one of: (i) a subset of combinations in which one or more transmission time intervals and one or more reference signal transmissions occupy a contiguous series of symbols ending with the last symbol of a sub-frame; and (ii) a subset of combinations in which one or more transmission time intervals and one or more reference signal transmissions occupy a contiguous series of symbols ending with the last symbol of the first half of a sub-frame.

According to one embodiment, said uplink grant indicates at least one of: (i) the number of said one or more uplink transmission time intervals for use by the communication device, (ii) the first symbol of a contiguous set of symbols occupied by the one or more uplink transmission time intervals and the one or more uplink reference signal transmissions, and (iii) the location of the one or more uplink reference signal transmissions within said contiguous set of symbols.

According to one embodiment, said one or more reference signals are uplink demodulation reference signals.

There is also provided an apparatus comprising: a processor and memory including computer program code, wherein the memory and computer program code are configured to, with the processor, cause the apparatus to: A method, comprising: recovering an uplink grant from a downlink transmission made by a network node, wherein said uplink grant identifies one combination from a set of predetermined combinations of one or more transmission time intervals and one or more uplink reference signal transmissions, including at least one combination of two or more transmission time intervals and one or more uplink reference signal transmissions; and controlling the making of data transmissions in said one or more transmission time intervals of the identified combination.

According to one embodiment, the memory and computer program code are further configured to, with the processor, cause the apparatus to: in advance of recovering said uplink grant: recover, from one or more downlink transmissions by the network node, control information for the communication device indicating use of said set of predetermined combinations for uplink transmissions from the communication device.

According to one embodiment, said control information is transmitted in a transmission time interval longer than a transmission time interval used for transmission of said uplink grant.

According to one embodiment, the identified combination comprises two or more transmission time intervals for two or more uplink data transmissions by a communication device, and one or more uplink reference signal transmissions.

According to one embodiment, the identified combination comprises one transmission time interval for one uplink data transmission by a communication device, and one or more uplink reference signal transmissions.

According to one embodiment, said set of predetermined combinations include one or more of the following: (a) one or more combinations in which an uplink reference signal occupies the first symbol after a first scheduled transmission time interval, and any additional transmission time intervals follow said uplink reference signal; (b) one or more combinations in which a single uplink reference signal occupies the first scheduled symbol, and one or more transmission time intervals occupy a contiguous set of symbols immediately after the uplink reference signal transmission; and (c) one or more combinations in which uplink reference signal transmissions occupy both the first scheduled symbol and a predetermined symbol.

According to one embodiment, the number of uplink reference signal transmissions is smaller than, or equal to, the number of transmission time intervals.

According to one embodiment, said set of predetermined combinations comprises at least one of: (i) a subset of combinations in which one or more transmission time intervals and one or more reference signal transmissions occupy a contiguous series of symbols ending with the last symbol of a sub-frame; and (ii) a subset of combinations in which one or more transmission time intervals and one or more reference signal transmissions occupy a contiguous series of symbols ending with the last symbol of the first half of a sub-frame.

According to one embodiment, said uplink grant indicates at least one of: (i) the number of said uplink transmission time intervals for use by the communication device, (ii) the first symbol of a contiguous set of symbols occupied by the one or more uplink transmission time intervals and the one or more uplink reference signal transmissions, and (iii) the location of the one or more uplink reference signal transmissions within said contiguous set of symbols.

According to one embodiment, said one or more reference signals are uplink demodulation reference signals.

There is also provided an apparatus comprising: means for controlling downlink transmission of an uplink grant for one or more uplink data transmissions by a communication device, wherein said uplink grant identifies one combination from a set of predetermined combinations of one or more transmission time intervals and one or more uplink reference signal transmissions, including at least one combination of two or more transmission time intervals and one or more uplink reference signal transmissions; and means for using said one or more uplink reference signal transmissions of the identified combination to assist the recovery of data from the one or more uplink radio data transmissions by said communication device in the one or more transmission time intervals of the identified combination.

There is also provided an apparatus comprising: means for recovering an uplink grant from a downlink transmission made by a network node, wherein said uplink grant identifies one combination from a set of predetermined combinations of one or more transmission time intervals and one or more uplink reference signal transmissions, including at least one combination of two or more transmission time intervals and one or more uplink reference signal transmissions; and means for controlling the making of data transmissions in said one or more transmission time intervals of the identified combination.

There is also provided a computer program product comprising program code means which when loaded into a computer controls the computer to: control downlink transmission of an uplink grant for one or more uplink data transmissions by a communication device, wherein said uplink grant identifies one combination from a set of predetermined combinations of one or more transmission time intervals and one or more uplink reference signal transmissions, including at least one combination of two or more transmission time intervals and one or more uplink reference signal transmissions; and use said one or more uplink reference signal transmissions of the identified combination to assist the recovery of data from the one or more uplink radio data transmissions by said communication device in the one or more transmission time intervals of the identified combination.

There is also provided a computer program product comprising program code means which when loaded into a computer controls the computer to: recover an uplink grant from a downlink transmission made by a network node, wherein said uplink grant identifies one combination from a set of predetermined combinations of one or more transmission time intervals and one or more uplink reference signal transmissions, including at least one combination of two or more transmission time intervals and one or more uplink reference signal transmissions; and control the making of data transmissions in said one or more transmission time intervals of the identified combination.

Examples of techniques according to embodiments of the invention are described hereunder in detail, by way of example only, with reference to the accompanying drawings, in which:

FIGS. 4a and 4b illustrate some examples of combinations of short TTIs and reference signals according to an embodiment of the present invention;

A technique according to an embodiment of the present invention is described in detail below for one example of a communication system based on the division of radio resources into sub-frames each comprising 14 OFDM or SC-FDMA symbol time units, but the same technique is applicable to other communication systems.

Figure 1:
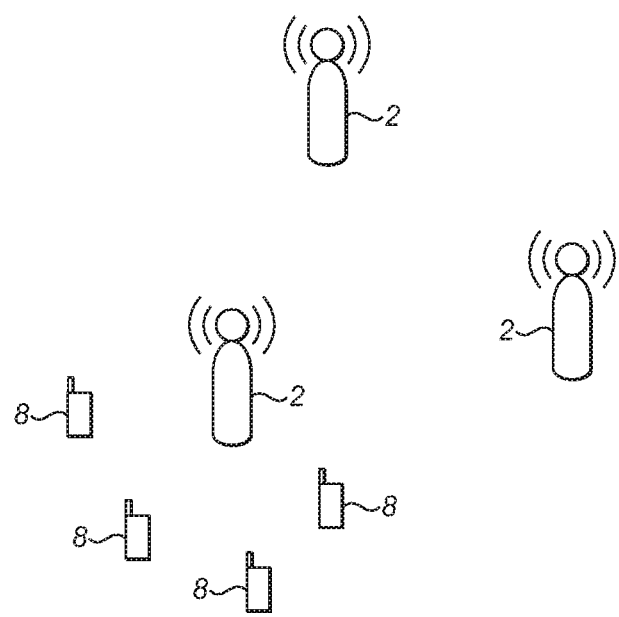
FIG. 1 illustrates one example of an environment in which embodiments of the present invention may be implemented.

FIG. 1 schematically shows an example of four user equipments (UEs) (for example, high complexity devices such as smartphones etc. low complexity devices such as MTC devices or any other type of wireless communication device) 8 located within the coverage area of a cell operated by a wireless network infrastructure node (wireless access point, eNB and the like) 2 belonging to a radio access network. FIG. 1 illustrates the example of eNBs as cell nodes; however, it should be understood that instead of eNB there can be any other type of wireless infrastructure nodes. Furthermore, FIG. 1 only shows a small number of eNBs, but a radio access network typically comprises a large number of eNBs each operating one or more cells.

Each eNB 2 of a radio access network is typically connected to one or more core network entities and/or a mobile management entity etc., but these other entities are omitted from FIG. 1 for conciseness.

Figure 2:
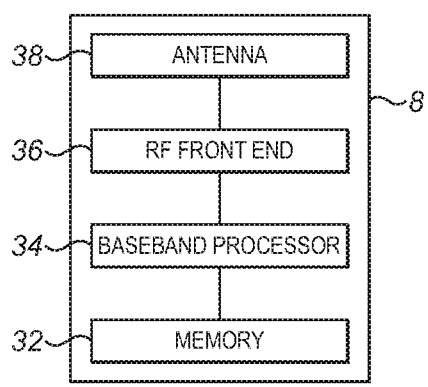
FIG. 2 illustrates one example of apparatus for use at the UEs of FIG. 1.

FIG. 2 shows a schematic view of an example of apparatus for each UE 8. The UE 8 may be used for various tasks such as making and receiving phone calls, receiving and sending data from and to a data network, and experiencing, for example, multimedia or other content. The UE 8 may be any device at least capable of both recovering data/information from radio transmissions made by the eNB 2, and making radio transmissions from which data/information is recoverable by the eNB 2. Non-limiting examples of user equipment (UE) 8 include smartphones, tablets, personal computers, and devices without any user interface, such as devices that are designed for machine type communications (MTC).

With reference to FIG. 2, a baseband processor 34, operating in accordance with program code stored at memory 32, controls the generation and transmission of radio signals via radio-frequency (RF) front end 36 and antenna 38. The RF front end 36 may include an analogue transceiver, filters, a duplexer, and antenna switch. Also, the combination of antenna 38, RF front end 36 and baseband processor 34 recovers data/information from radio signals reaching UE 8 from e.g. eNB 2. The UE 8 may also comprise an application processor (not shown) that generates user data for transmission via radio signals, and processes user data recovered from radio signals by baseband processor 34 and stored at memory 32.

The application processor and the baseband processor 34 may be implemented as separate chips or combined into a single chip. The memory 32 may be implemented as one or more chips. The memory 32 may include both read-only memory and random-access memory. The above elements may be provided on one or more circuit boards.

The UE may include additional other elements not shown in FIG. 2. For example, the UE 8 may include a user interface such as a key pad, voice command recognition device, touch sensitive screen or pad, combinations thereof or the like, via which a user may control operation of the UE 8. The UE 8 may also include a display, a speaker and a microphone. Furthermore, the UE 8 may comprise appropriate connectors (either wired or wireless) to other devices and/or for connecting external accessories (e.g. hands-free equipment) thereto.

Figure 3:
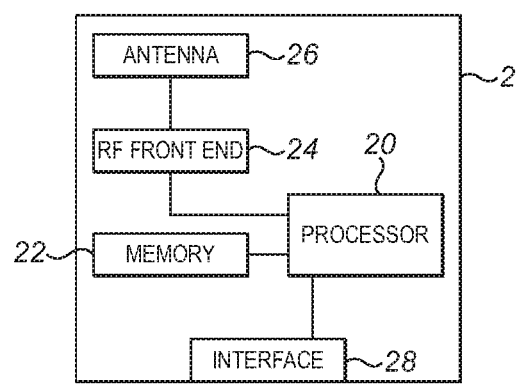
FIG. 3 illustrates one example of apparatus for use at the eNB of FIG. 1.

FIG. 3 shows an example of apparatus for use at the eNB 2 of FIG. 1. A broadband processor 20, operating in accordance with program code stored at memory 22, (a) controls the generation and transmission of radio signals via the combination of RF front end 24 and antenna 26; and (b) recovers data from radio signals reaching the eNB from e.g. UEs 8. The RF front end may include an analogue transceiver, filters, a duplexer, and antenna switch. Both the processor 20 and the memory 22 may be implemented as one or more chips. The memory 22 may include both read-only memory and random-access memory. The above elements may be provided on one or more circuit boards. The apparatus also comprises an interface 28 for transferring data to and from one or more other entities such as e.g. core network entities, mobile management entities, and other eNBs in the same access network.

It should be appreciated that the apparatus shown in each of FIGS. 2 and 3 described above may comprise further elements which are not directly involved with the embodiments of the invention described hereafter.

Figure 5:
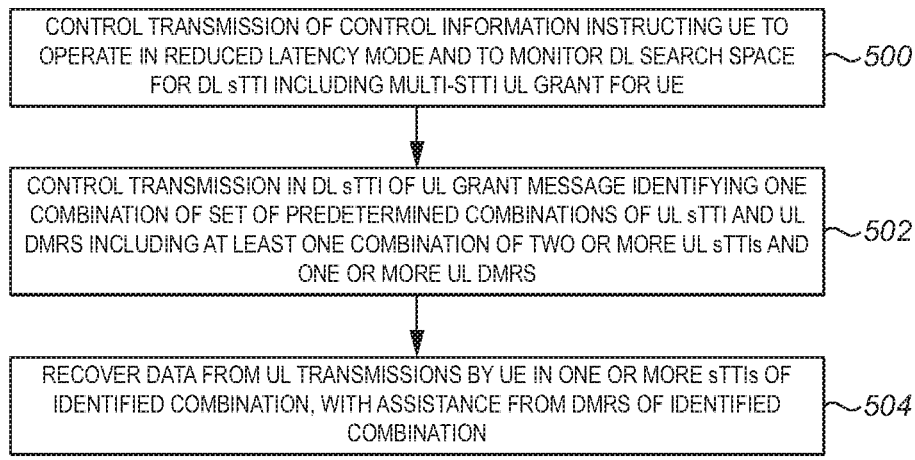
FIG. 5 illustrates an example of a set of operations at a processor of a network node according to an embodiment of the present invention.
Figure 6:
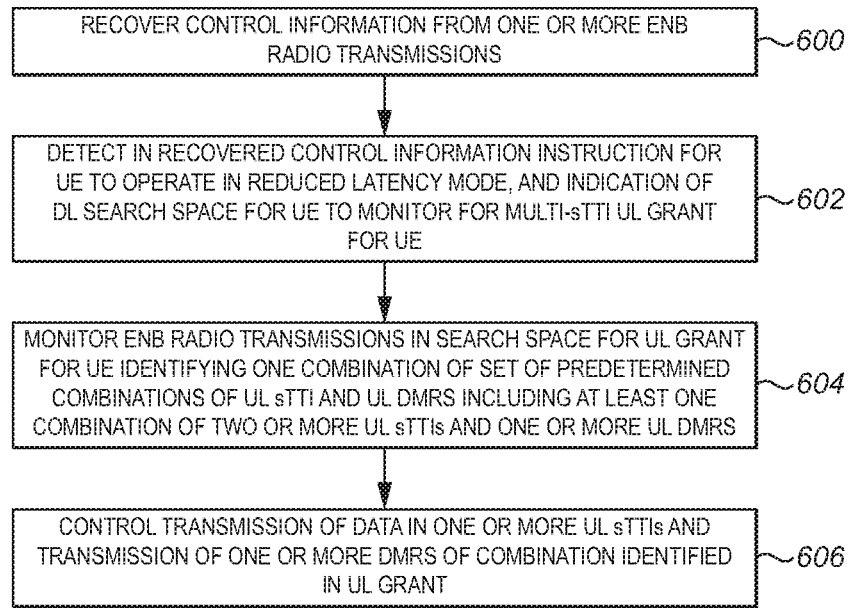
FIG. 6 illustrates an example of a set of operations at a processor of a communication device according to an embodiment of the present invention.

FIGS. 5 and 6 illustrate example of operations at the processors at UE 8 and eNB 2 according to one embodiment. All operations carried out by the UE processor 34 follow program code stored at UE memory 32; and all operations carried out by the eNB processor 20 follow program code stored at eNB memory 22.

The term sTTI is used below to refer to a TTI shorter than a sub-frame, and may, for example, include a TTI having a length of two OFDM or SC-FDMA symbols.

The eNB baseband processor 20 controls the transmission (via the eNB RF front end 24 and eNB antenna 26) of control information instructing the UE 8 to operate in reduced latency mode using sTTIs, and to monitor a search space for a downlink sTTI including a multi-sTTI UL grant for the UE (STEP 500 of FIG. 5). This control information may, for example, be included in a radio resource configuration (RRC) message sent on a physical downlink shared channel (PDSCH) using a short TTI, or be transmitted on a physical downlink control channel using a 14-OFDM symbol TTI. The UE baseband processor 34 recovers control information for the UE 8 from radio transmissions made by the eNB 2 and received at the UE baseband processor 34 via UE antenna 38 and UE RF front end 36 (STEP 600 of FIG. 6). The UE baseband processor 34 detects in the recovered control information the instruction for UE 8 to operate in reduced latency mode (STEP 602), and the UE baseband processor 34 configures itself accordingly. The control information from the eNB 2 may include e.g. information about a search space to monitor for a DL sTTI including a multi-sTTI UL grant, and information about use of new data indicators (NDI) and redundancy version (RV) indicators (discussed below) in multi-sTTI UL grants.

When there is data to send from the UE 8 to the network, the eNB baseband processor 20 controls the transmission (via the eNB RF front end 24 and eNB antenna 26) of a UL grant message indicating one combination of a predetermined set of combinations of (i) one or more UL sTTIs for UE 8 to make data transmissions and (ii) a timing for one or more uplink demodulation reference signals (DMRS) to assist the eNB 2 in recovering data from data transmissions made by the UE 8 in the UL sTTIs (STEP 502 of FIG. 5); wherein the predetermined set of combinations includes at least one combination comprising two or more UL sTTIs and one or more DMRS.

Figure 4A:
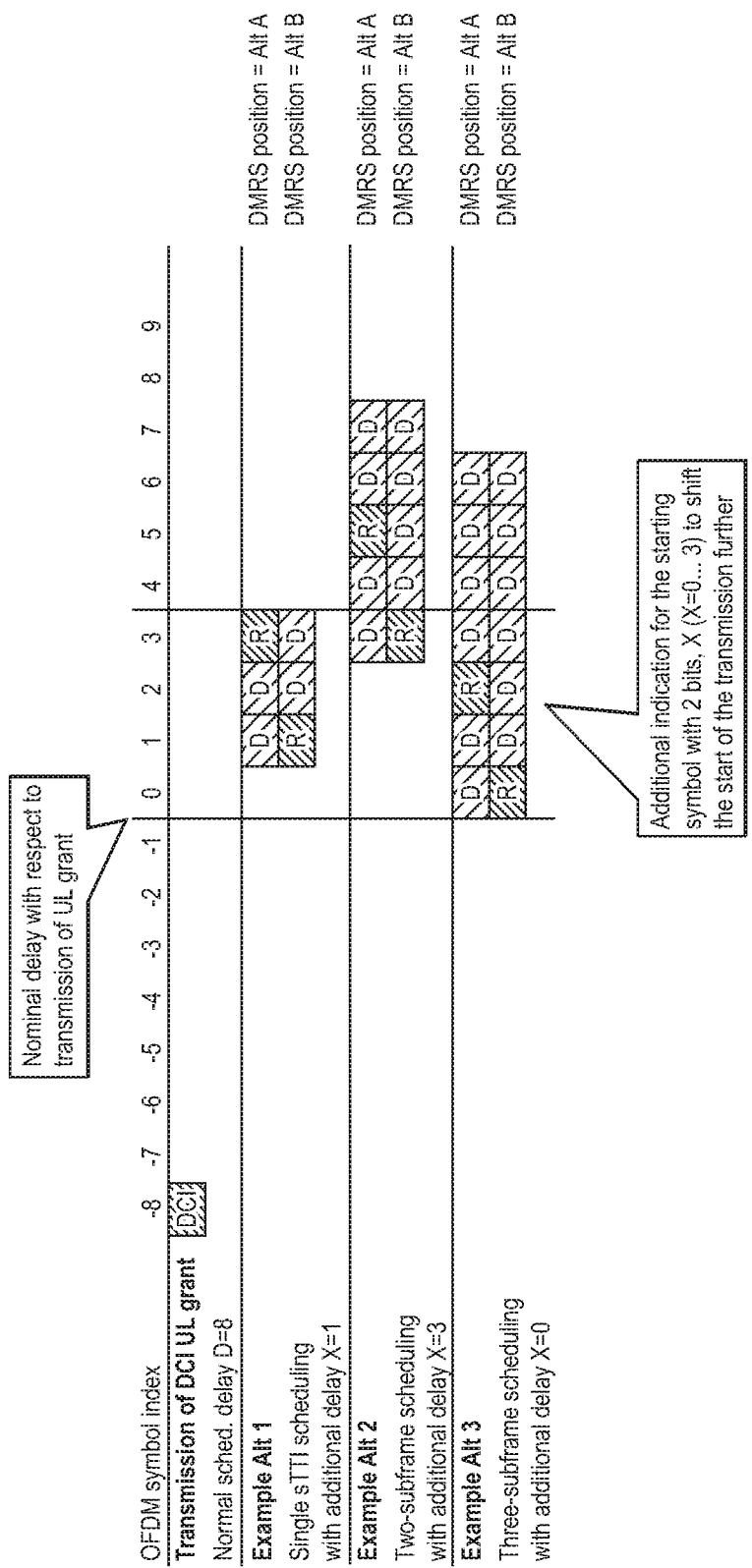

In one example, the eNB baseband processor 20 controls the making (via the eNB RF front end 24 and eNB antenna 26), in the designated search space, of a single downlink control channel transmission (e.g. a single UL grant message) indicating one of the combinations of UL sTTIs and DMRS shown in FIGS. 4(a) and 4(b). In FIGS. 4a and 4b, SC-FDMA symbols labelled "D" designate data symbols and SC-FDMA symbols labelled "R" designate reference signals. These combinations include: (1) a single UL sTTI with single DMRS; (2) a predetermined number of two or more consecutive UL sTTIs, such as e.g. two or three UL sTTIs, and a single DMRS; (3) a combination of two or more UL sTTIs and one or more DMRS filling all the SC-FDMA symbols between a first scheduled symbol and the end of the sub-frame containing the first scheduled SC-FDMA symbol, or the end of the first slot of the sub-frame immediately after the sub-frame containing the first SC-FDMA OFDM symbol.

In some combinations (designated in FIG. 4a as "Alt A" combinations), the DMRS occupies the first SC-FDMA symbol after the first scheduled UL sTTI for the UE 8, and any additional UL sTTIs for the UE follow the DMRS. This is the optimal option for providing a good channel estimate for recovering data from any UL sTTIs after the DMRS re-using the same single DMRS. In other combinations (designated in FIG. 4a as "Alt B" combinations), a single DMRS occupies the first scheduled SC-FDMA symbol for the UE 8, and all the UL sTTIs for the UE 8 occupy a contiguous set of SC-FDMA symbols immediately after the DRMS. This is the optimal option for guaranteeing decoding latency to be the same for all scheduled UL sTTIs for the UE 8.

In one example, the multi-sTTI grant message transmitted by the eNB 2 includes an additional 5-bits. As shown in the table below, a first 2 bits of the additional 5 bits indicate whether the uplink resources scheduled for uplink data transmissions by the UE 8 comprise (a) a set of one, two or three 2-symbol UL sTTIs that occupy, together with an associated DMRS, a contiguous set of SC-FDMA symbols beginning at zero, one, two or three SC-FDMA symbols after the earliest possible UL transmission start (e.g. eight SC-FDMA symbols after the DL OFDM symbol including the multi-sTTI UL grant message in the example of FIG. 4a), or (b) one of 8 predetermined combinations of one or more 2-symbol UL sTTIs and DMRS, wherein each predetermined combination occupies a contiguous set of SC-FDMA symbols ending with an SC-FDMA symbol at the end of a sub-frame or the end of the first half (first slot) of a sub-frame.

| Scheduled Subframes Field (2 bit) | Starting symbol Field (2 bit) | UL-DMRS position Field (1 bit) |
|---|---|---|
| 00 - 1 sTTI scheduled<br>01 - 2 sTTIs scheduled<br>10 - 3 sTTIs scheduled | Delay in terms of number of SC-FDMA symbols (0, 1, 2, or 3 symbols) | Indicating DMRS position in terms of sTTI delay (codepoints 0 or 1, corresponding to Alt A and Alt B, respectively) |
| 11 - variable number of sTTIs until slot or subframe boundary | Using the 2 bit from starting symbol indication and the 1 bit UL-DMRS position to indicate jointly one of the eight alternatives for scheduling sTTIs with a different combination of starting symbol, number of scheduled subframes (between 3 and 6) as well as UL-DMRS symbol position(s) as shown in FIG. 4b. | |

If these first two additional bits indicate option (a) above, the $3^{rd}$ and $4^{th}$ bits of the 5 additional bits indicate the index of the SC-FDMA symbol at which the set of UL sTTIs and DMRS begin relative to the first possible UL transmission opportunity based on the timing of the Multi-sTTI UL grant transmission (e.g. eight symbols after the DL OFDM symbol including the multi-sTTI UL grant message in the example of FIG. 4a); and the $5^{th}$ bit of the additional 2 bits indicates one of two alternative timing positions for a single DMRS for use by the eNB 2 in recovering data from radio transmissions made in the one or more 2-symbol UL sTTIs identified in the UL grant. In other words, the $1^{st}$, $2^{nd}$ and $5^{th}$ bits of the additional five bits indicate one combination of a set of predetermined combinations of sTTI and DMRS, and the $3^{rd}$ and $4^{th}$ bits of the additional 5 bits indicate a starting timing for the combination of sTTI and DMRS indicated by the $1^{st}$, $2^{nd}$ and $5^{th}$ bits.

On the other hand, if the first two additional bits indicate option (b) above, the next 3 bits of the additional five bits indicate one of the eight different combinations of 2-symbol UL sTTIs and DMRS. In the example illustrated in FIG. 4(b), each of the eight different combinations comprises DMRS occupying the SC-FFDMA symbol before the first of the 2-symbol UL sTTI scheduled for the UE 8 and/or a predetermined position (i.e. SC-FDMA symbol #3, or SC-FDMA symbol #10, depending on whether the combination of UL sTTIs and DRMS ends at the end of a sub-frame or at the end of the first half (first slot) of a sub-frame). In this way, the additional five bits in the multi-sTTI UL grant message provide a joint indication of the starting point of the UL transmission, the number of scheduling UL sTTIs and the reference signal structure.

One alternative example is as follows. If the 2-bit Scheduled SF field is set to "11", i.e. option (b) above, information about which of the 8 predetermined alternative combinations of UL sTTI and DMRS to use by the UE 8 is provided by the scheduling instance (i.e. the OFDM symbol index of the DL sTTI including the multi-sTTI UL grant message). The OFDM symbol index of the DL sTTI including the multi-sTTI UL grant message indicates the selection of four predetermined combinations from the total of eight predetermined combinations, e.g. whether the configuration is one ending on the slot boundary or one ending on the subframe boundary, and a further two bits are sufficient to indicate the selected combination from these 4 predetermined combinations. This alternative example releases one bit (from the additional five bits) in the multi-sTTI UL grant message for other control information, such as e.g. RV indicator when more than three UL sTTIs are scheduled by one multi-sTTI UL grant message. Regarding the inclusion of NDI and RV information in the multi-sTTI UL grant message: a first option is to further increase the size of the multi-sTTI UL grant message to include sTTI-specific NDI and RV for each scheduled sTTI indicated in the multi-sTTI UL grant message. A second option is to explicitly indicate NDI and RV in the multi-sTTI UL grant message for only the first n TTIs (e.g. three sTTIs) of all the sTTIs scheduled by the multi-sTTI UL grant message, and to configure the UE baseband processor 34 to assume new data transmission and RV0 for any additional one or more sTTIs scheduled by the multi-sTTI UL grant message. The UE baseband processor 34 could be pre-configured for either of these options, or the eNB baseband processor 20 could control the transmission of control information to dynamically configure the UE baseband processor 34 for either of these two options.

When encoding the multi-sTTI UL grant message (including the 5 additional bits), the eNB baseband processor 20 attaches a CRC that is scrambled with an identifier for the UE 8 for which the message is intended.

The UE baseband processor 34 searches in radio transmissions received via UE antenna 38 and UE RF front end 36 in predetermined search spaces, or search spaces indicated in control information transmitted by the eNB 2, for a DL sTTI including a multi-sTTI UL grant message that it is able to decode using its UE identifier (e.g. UE radio network temporary identifier (UE-RNTI)) (STEP 604 of FIG. 6). The UE baseband processor 34 then controls the making of UL data and DMRS transmissions via the UE RF front end 36 and UE antenna 38, based on the information included in the multi-sTTI UL grant message including the above-mentioned 5 additional bits (STEP 606 of FIG. 6).

The eNB baseband processor 20 recovers data from radio transmissions detected via the eNB antenna 26 and eNB RF front end 24 in the UL sTTIs indicated in the multi-sTTI UL grant message transmitted by the eNB 2, with assistance from the DMRS transmission(s) detected via the eNB antenna 26 and eNB RF front end 24 in the positions (OFDM symbols) indicated in the multi-sTTI UL grant message transmitted by the eNB 2 (STEP 504 of FIG. 5).

The example described in detail above can provide the following advantages when multiple UL sTTIs are assigned to a UE: (i) a reduction in DL control signalling overhead; (ii) a reduction in UL DMRS overhead; and (iii) robust operation (transmission of necessary DMRS) even in the event of a DL control signalling (short PDCCH) error. In addition, the scheduling of more than one UL sTTI in a single multi-sTTI UL grant message in a DL sTTI can also facilitate the scheduling of sTTI in uplink time resources that might otherwise be unavailable when scheduling a single sTTI by a multi-sTTI UL grant message based on the OFDM symbol index of the DL sTTI including the multi-sTTI UL grant message, because of variations in the number of OFDM symbols assigned to legacy PDCCH at the start of a sub-frame.

The example described above involves the use of 2-symbol TTIs, but the same kind of technique is also equally applicable to the use of short TTIs of different lengths, and/or mixtures of short TTIs of different lengths.

In one example, the multi-sTTI UL grant message may be based on a DCI Format 0 message.

Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method, comprising:
   recovering a single uplink grant from a downlink transmission by a network node, wherein said single uplink grant identifies one combination from a set of predetermined combinations of one or more transmission time intervals and one or more uplink reference signal transmissions, the set of predetermined combinations including at least one combination of two or more transmission time intervals and one or more uplink reference signal transmissions; and
   controlling data transmissions in said one or more transmission time intervals of the identified combination, scheduled by the single uplink grant,
   wherein said set of predetermined combinations includes one or more of the following:
   one or more combinations in which an uplink reference signal occupies a first symbol after a first scheduled transmission time interval, and any additional transmission time intervals follow said uplink reference signal; or
   one or more combinations in which uplink reference signal transmissions occupy both a first scheduled symbol and a predetermined symbol in each of the one or more combinations.

2. The method according to claim 1, wherein the identified combination comprises one transmission time interval for one uplink data transmission by a communication device, and one or more uplink reference signal transmissions.

3. The method according to claim 1, wherein said set of predetermined combinations further includes:
   one or more combinations in which a single uplink reference signal occupies the first scheduled symbol, and one or more transmission time intervals occupy a contiguous set of symbols immediately after the uplink reference signal transmissions.

4. The method according to claim 1, wherein said set of predetermined combinations comprises at least one of:
   (i) a subset of combinations in which one or more transmission time intervals and one or more uplink reference signal transmissions occupy a contiguous series of symbols ending with the last symbol of a sub-frame; or
   (ii) a subset of combinations in which one or more transmission time intervals and one or more uplink reference signal transmissions occupy a contiguous series of symbols ending with the last symbol of the first half of a sub-frame.

5. The method according to claim 1, wherein said single uplink grant indicates at least one of:
   (i) a number of uplink transmission time intervals for use by a communication device,
   (ii) the first symbol of a contiguous set of symbols occupied by one or more uplink transmission time intervals and the one or more uplink reference signal transmissions, or
   (iii) a location of the one or more uplink reference signal transmissions within said contiguous set of symbols.

6. The method according to claim 1, wherein said one or more uplink reference signals are uplink demodulation reference signals.

7. An apparatus comprising: a processor and memory including computer program code, wherein the memory and computer program code are configured to, with the processor, cause the apparatus at least to:
   control downlink transmission of a single uplink grant for one or more uplink data transmissions by a communication device, wherein said single uplink grant identifies one combination from a set of predetermined combinations of one or more transmission time intervals and one or more uplink reference signal transmissions, the set of predetermined combinations including at least one combination of two or more transmission time intervals and one or more uplink reference signal transmissions; and use said one or more uplink reference signal transmissions of the identified combination to assist the recovery of data from the one or more uplink radio data transmissions by said communication device in the one or more transmission time intervals of the identified combination, scheduled by the single uplink grant, wherein said set of predetermined combinations includes one or more of the following:

one or more combinations in which an uplink reference signal occupies a first symbol after a first scheduled transmission time interval, and any additional transmission time intervals follow said uplink reference signal; or one or more combinations in which uplink reference signal transmissions occupy both a first scheduled symbol and a predetermined symbol in each of the one or more combinations.

8. The apparatus according to claim 7, wherein the identified combination comprises a combination of one uplink transmission time interval for one uplink data transmissions by the communication device, and one or more uplink reference signal transmissions.

9. The apparatus according to claim 7, wherein said set of predetermined combinations further includes:

one or more combinations in which a single uplink reference signal occupies the first scheduled symbol, and one or more transmission time intervals occupy a contiguous set of symbols immediately after the uplink reference signal transmissions.

10. The apparatus according to claim 7, wherein a number of uplink reference signal transmissions is smaller than or equal to a number of transmission time intervals.

11. The apparatus according to claim 7, wherein said set of predetermined combinations comprises at least one of:

(i) a subset of combinations in which one or more transmission time intervals and one or more uplink reference signal transmissions occupy a contiguous series of symbols ending with the last symbol of a sub-frame; or (ii) a subset of combinations in which one or more transmission time intervals and one or more uplink reference signal transmissions occupy a contiguous series of symbols ending with the last symbol of the first half of a sub-frame.

12. The apparatus according to claim 7, wherein said single uplink grant indicates at least one of:

(i) a number of one or more uplink transmission time intervals for use by the communication device, (ii) the first symbol of a contiguous set of symbols occupied by one or more uplink transmission time intervals and the one or more uplink reference signal transmissions, or (iii) a location of the one or more uplink reference signal transmissions within said contiguous set of symbols.

13. The apparatus according to claim 7, wherein said one or more uplink reference signals are uplink demodulation reference signals.

14. An apparatus comprising: a processor and memory including computer program code, wherein the memory and computer program code are configured to, with the processor, cause the apparatus at least to:

recover a single uplink grant from a downlink transmission by a network node, wherein said single uplink grant identifies one combination from a set of predetermined combinations of one or more transmission time intervals and one or more uplink reference signal transmissions, the set of predetermined combinations including at least one combination of two or more transmission time intervals and one or more uplink reference signal transmissions; and control data transmissions in said one or more transmission time intervals of the identified combination, scheduled by the single uplink grant, wherein said set of predetermined combinations includes one or more of the following:

one or more combinations in which an uplink reference signal occupies a first symbol after a first scheduled transmission time interval, and any additional transmission time intervals follow said uplink reference signal; or one or more combinations in which uplink reference signal transmissions occupy both a first scheduled symbol and a predetermined symbol in each of the one or more combinations.

15. The apparatus according to claim 14, wherein the identified combination comprises one transmission time interval for one uplink data transmission by the apparatus, and one or more uplink reference signal transmissions.

16. The apparatus according to claim 14, wherein said set of predetermined combinations further includes:

one or more combinations in which a single uplink reference signal occupies the first scheduled symbol, and one or more transmission time intervals occupy a contiguous set of symbols immediately after the uplink reference signal transmissions.

17. The apparatus according to claim 14, wherein a number of uplink reference signal transmissions is smaller than, or equal to, a number of transmission time intervals.

18. The apparatus according to claim 14, wherein said set of predetermined combinations comprises at least one of:

(i) a subset of combinations in which one or more transmission time intervals and one or more uplink reference signal transmissions occupy a contiguous series of symbols ending with the last symbol of a sub-frame; or (ii) a subset of combinations in which one or more transmission time intervals and one or more uplink reference signal transmissions occupy a contiguous series of symbols ending with the last symbol of the first half of a sub-frame.

19. The apparatus according to claim 14, wherein said single uplink grant indicates at least one of:

(i) a number of uplink transmission time intervals for use by the apparatus, (ii) the first symbol of a contiguous set of symbols occupied by one or more uplink transmission time intervals and the one or more uplink reference signal transmissions, or (iii) a location of the one or more uplink reference signal transmissions within said contiguous set of symbols.

20. The apparatus according to claim 14, wherein said one or more uplink reference signals are uplink demodulation reference signals.

* * * * *